(12) United States Patent
Vogl

(10) Patent No.: US 11,320,080 B2
(45) Date of Patent: May 3, 2022

(54) CONNECTION DEVICE

(71) Applicant: Hawle Water Technology Norge AS, Skui (NO)

(72) Inventor: Sebastian Vogl, Timelkam (AT)

(73) Assignee: Hawle Water Technology Norge AS, Skui (NO)

( * ) Notice: Subject to any disclaimer, the term of this patent is extended or adjusted under 35 U.S.C. 154(b) by 674 days.

(21) Appl. No.: 16/066,670

(22) PCT Filed: Dec. 1, 2016

(86) PCT No.: PCT/EP2016/079369
§ 371 (c)(1),
(2) Date: Jun. 28, 2018

(87) PCT Pub. No.: WO2017/114627
PCT Pub. Date: Jul. 6, 2017

(65) Prior Publication Data
US 2019/0017643 A1    Jan. 17, 2019

(30) Foreign Application Priority Data
Dec. 28, 2015    (AT) ............... A 51104/2015

(51) Int. Cl.
*F16L 41/14*    (2006.01)
*F16L 41/08*    (2006.01)
*F16L 41/10*    (2006.01)

(52) U.S. Cl.
CPC ............. *F16L 41/14* (2013.01); *F16L 41/086* (2013.01); *F16L 41/088* (2013.01); *F16L 41/10* (2013.01)

(58) Field of Classification Search
CPC ....... F16L 41/14; F16L 41/086; F16L 41/088; F16L 41/10; F16L 5/10; F16L 41/04; F16L 41/06
USPC .... 285/197, 205–206, 133.11, 133.21, 133.3
See application file for complete search history.

(56) References Cited

U.S. PATENT DOCUMENTS

| 1,542,645 | A | * | 6/1925 | Saucke | ................... | F16L 41/14 |
|---|---|---|---|---|---|---|
| | | | | | | 285/23 |
| 2,132,636 | A | | 11/1938 | Maahs | | |
| 2,481,142 | A | * | 9/1949 | Mueller | .................. | F16L 41/14 |
| | | | | | | 285/212 |
| 3,642,252 | A | * | 2/1972 | Phillips | ................... | F16L 41/14 |
| | | | | | | 251/145 |

(Continued)

FOREIGN PATENT DOCUMENTS

| CN | 102367900 | 3/2012 |
|---|---|---|
| DE | 7619362 | 6/1979 |

(Continued)

*Primary Examiner* — Matthew Troutman
*Assistant Examiner* — Fannie C Kee

(57) ABSTRACT

A connection device for connecting a main pipe (1) to a secondary pipe (2). The connection device includes a substantially cylindrical connection piece (3), able to be inserted, preferably able to be screwed, into a wall opening of the main pipe (1), for connection of the secondary pipe (2), wherein for sealing the connection piece (3) a preferably ring-shaped sealing element (4) is provided, lying against the main pipe (1), which sealing element is connected directly or via mechanical connecting elements to an outer circumference of the connection piece (3).

3 Claims, 14 Drawing Sheets

(56) References Cited

U.S. PATENT DOCUMENTS

| | | | | |
|---|---|---|---|---|
| 3,694,009 A * | 9/1972 | Phillips | ............... | F16L 47/30 |
| | | | | 285/197 |
| 3,863,960 A * | 2/1975 | Andersson | ............ | F16L 41/088 |
| | | | | 285/39 |
| 3,870,064 A * | 3/1975 | Vigneron | ............ | F16L 41/06 |
| | | | | 137/15.13 |
| 3,879,065 A * | 4/1975 | Kobayashi | ............ | E03D 11/17 |
| | | | | 285/39 |
| 3,953,555 A * | 4/1976 | Gley | ............... | B01F 3/0412 |
| | | | | 261/124 |
| 4,411,458 A * | 10/1983 | Strunk | ............... | F16L 41/088 |
| | | | | 285/196 |
| 5,150,928 A * | 9/1992 | Lodder | ............ | F16L 37/008 |
| | | | | 285/196 |
| 8,015,695 B2 * | 9/2011 | Polivka | ............ | F16L 41/14 |
| | | | | 29/709 |
| 8,870,231 B2 * | 10/2014 | Kawasetsu | ............ | F16L 9/14 |
| | | | | 285/204 |
| 2008/0030021 A1 * | 2/2008 | Theilen | ............ | A01G 25/092 |
| | | | | 285/5 |

FOREIGN PATENT DOCUMENTS

| | | | |
|---|---|---|---|
| DE | 3303434 | 8/1984 | |
| DE | 3637975 | 5/1988 | |
| DE | 202012103503 | 12/2013 | |
| EP | 0890777 | 1/1999 | |
| FR | 51550 E * | 10/1942 | ............ F16L 41/14 |
| FR | 2264238 A1 * | 10/1975 | ............ F16L 41/14 |
| FR | 2269673 A2 * | 11/1975 | ............ F16L 41/14 |
| GB | 2325294 | 11/1998 | |
| KR | 10-2011-0121165 | 11/2011 | |

\* cited by examiner

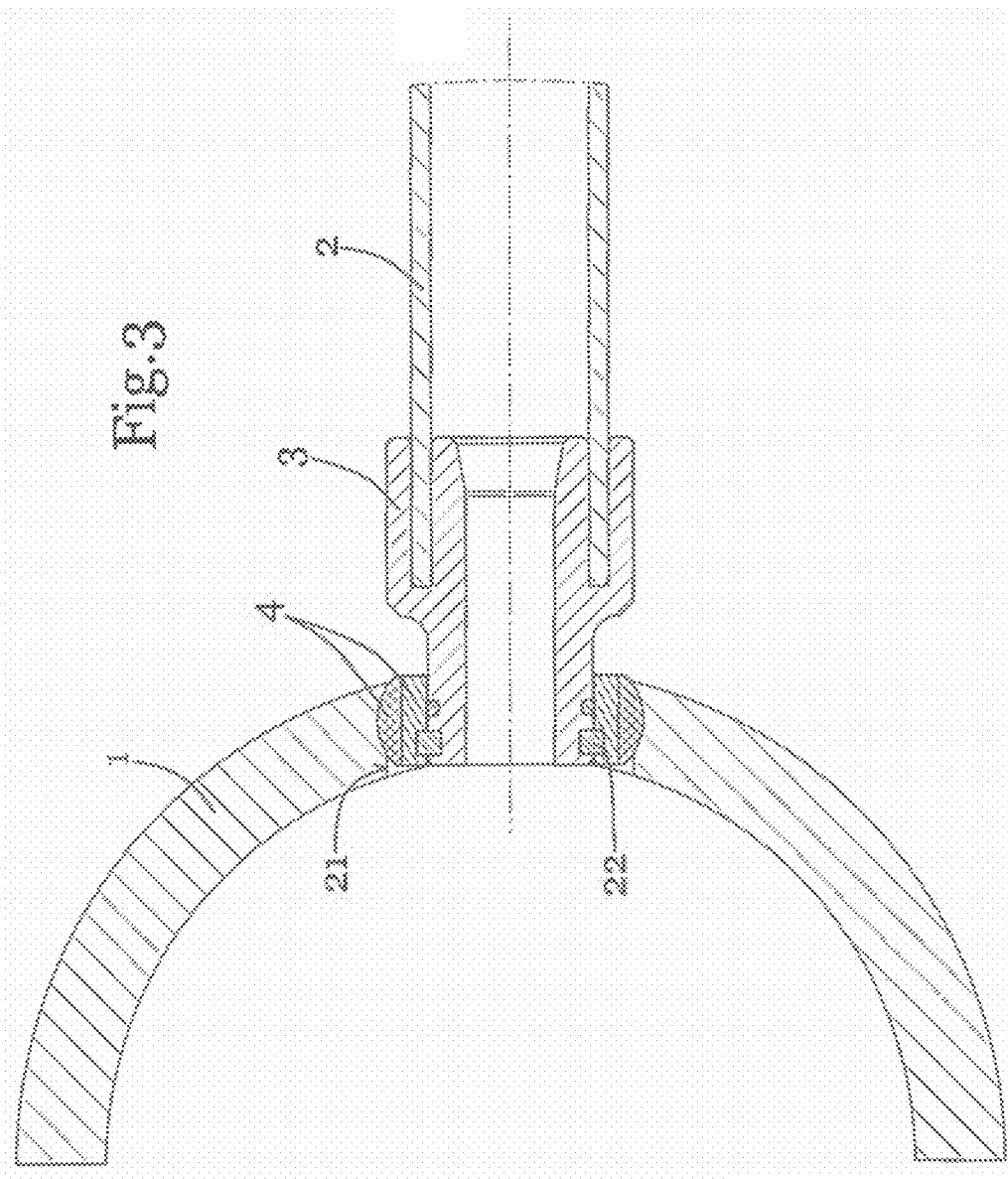

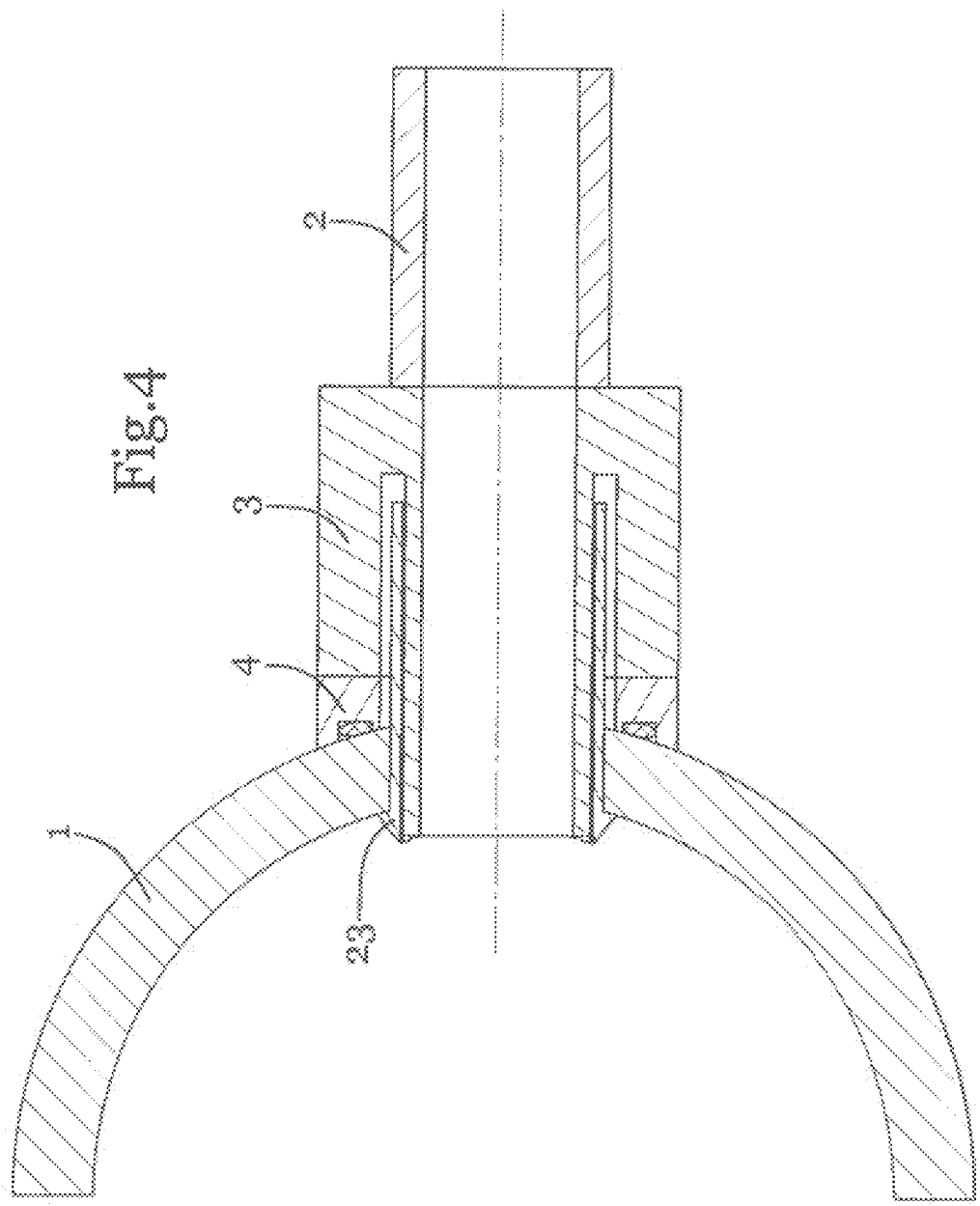

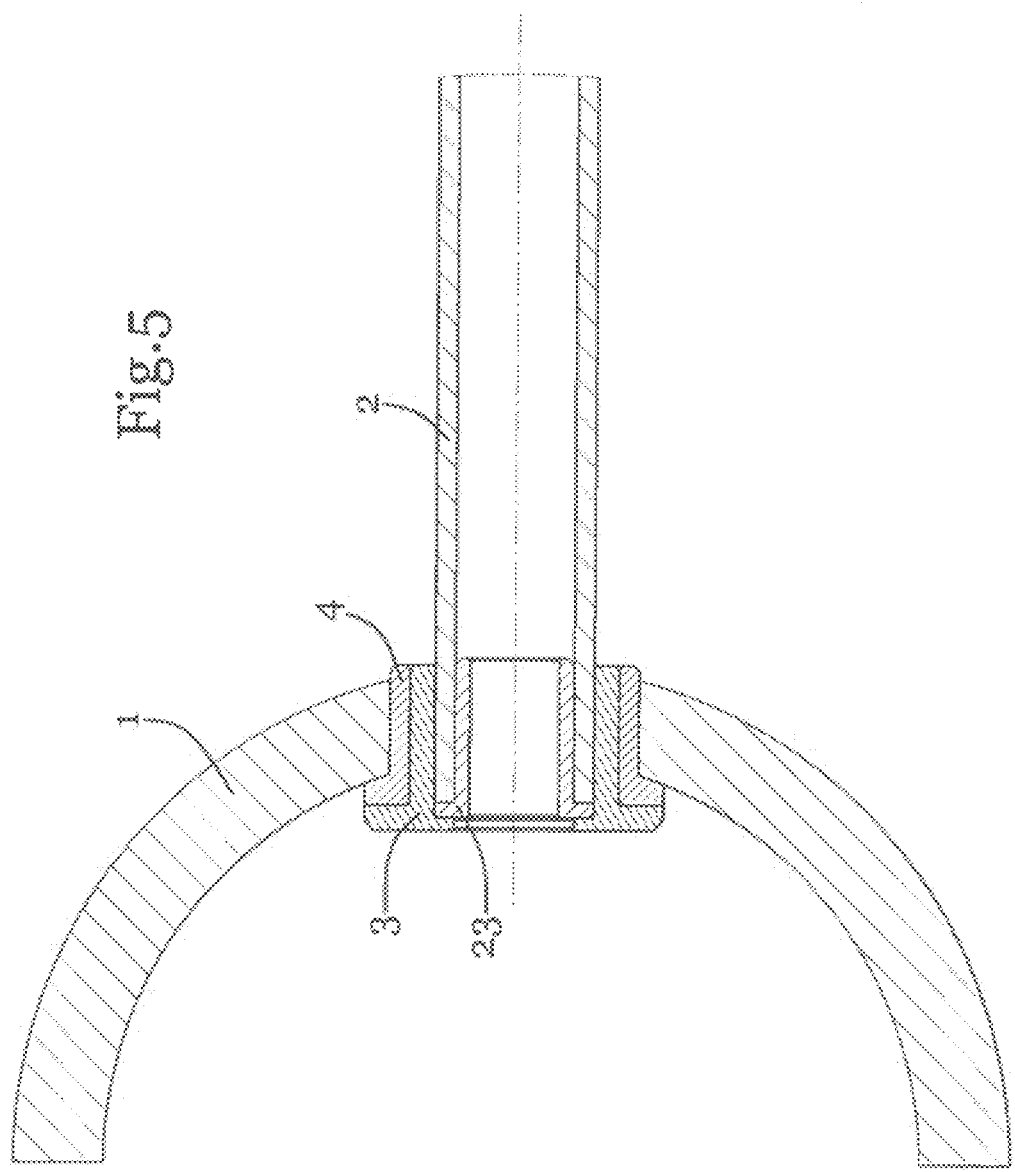

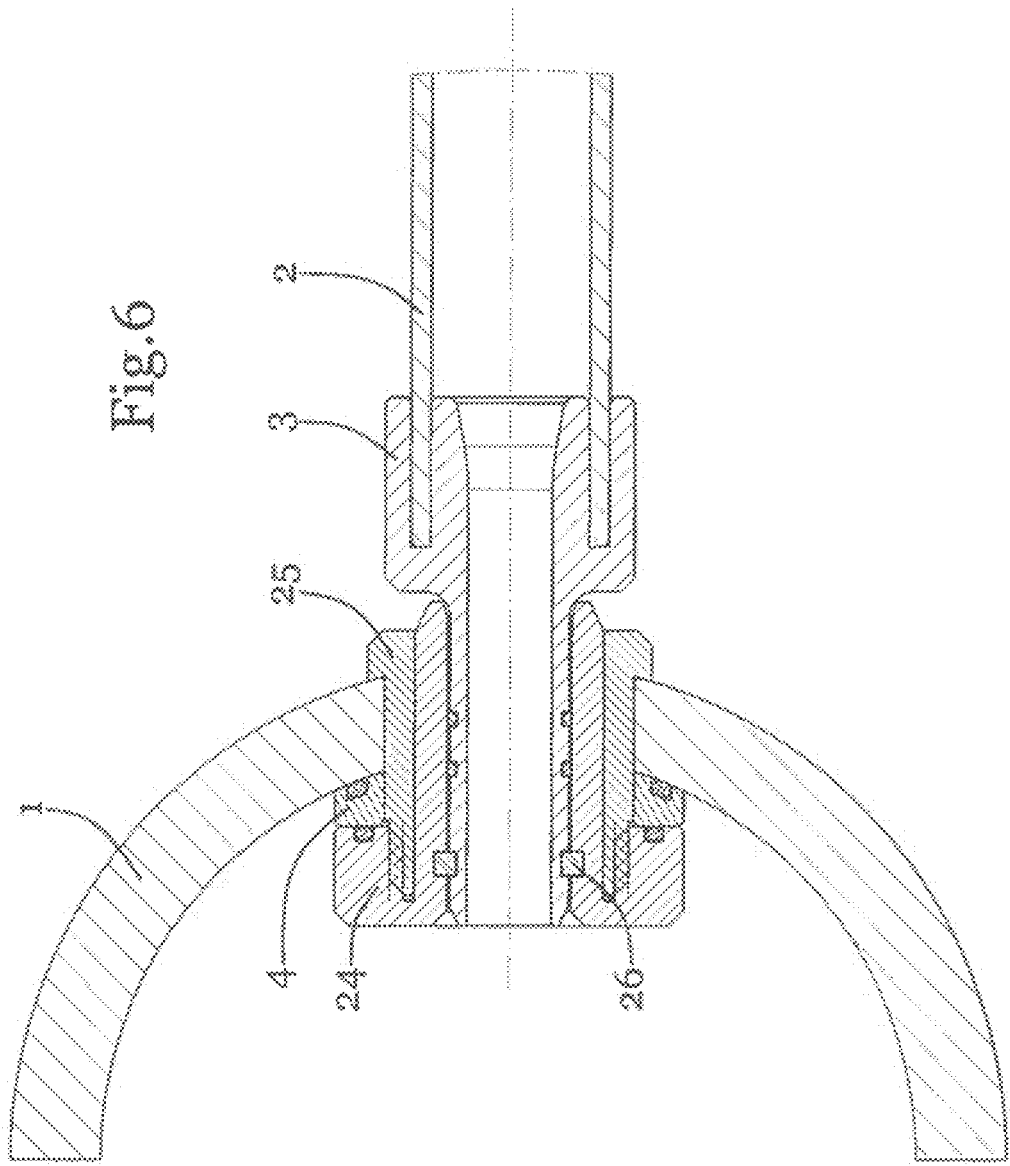

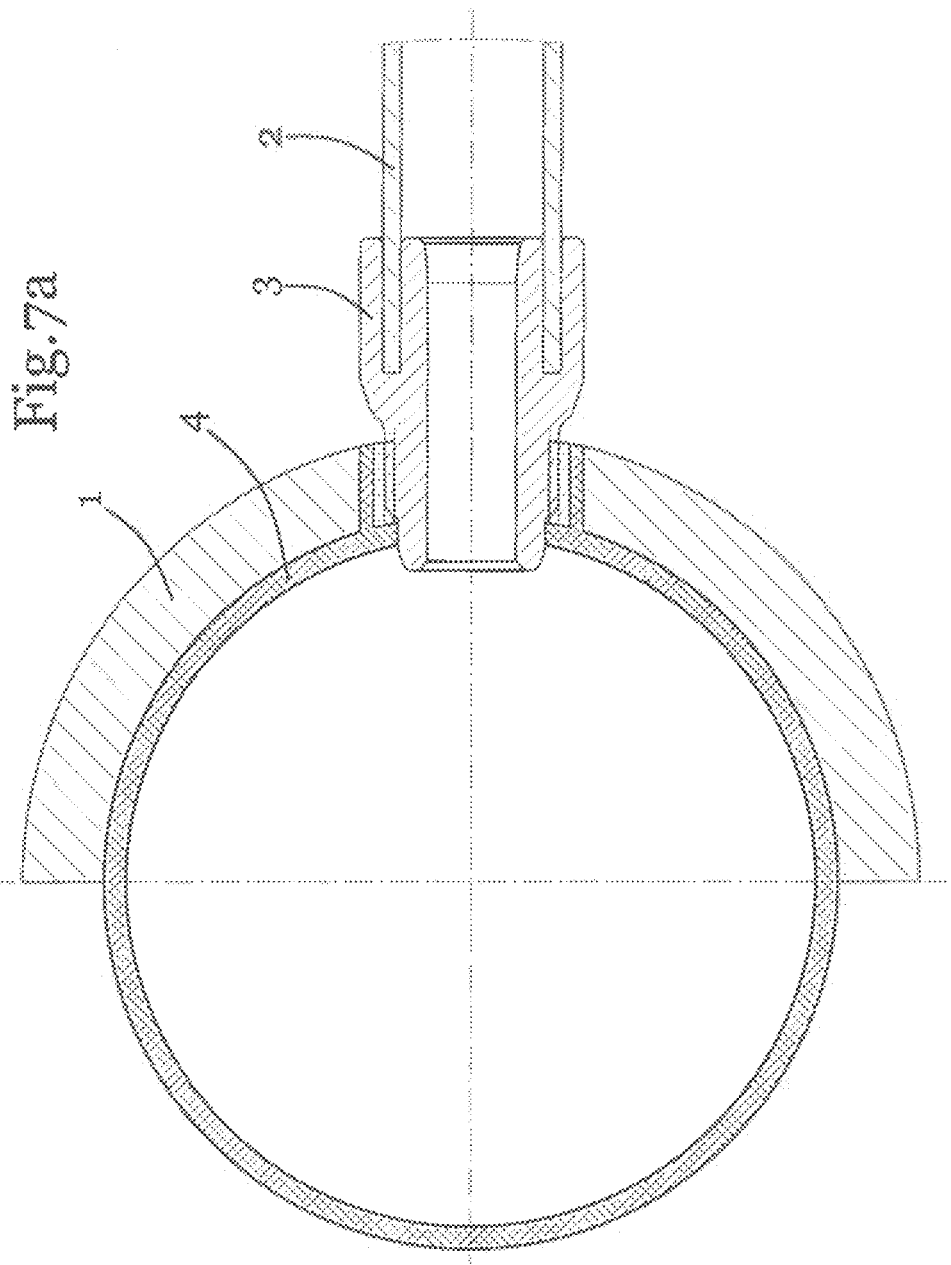

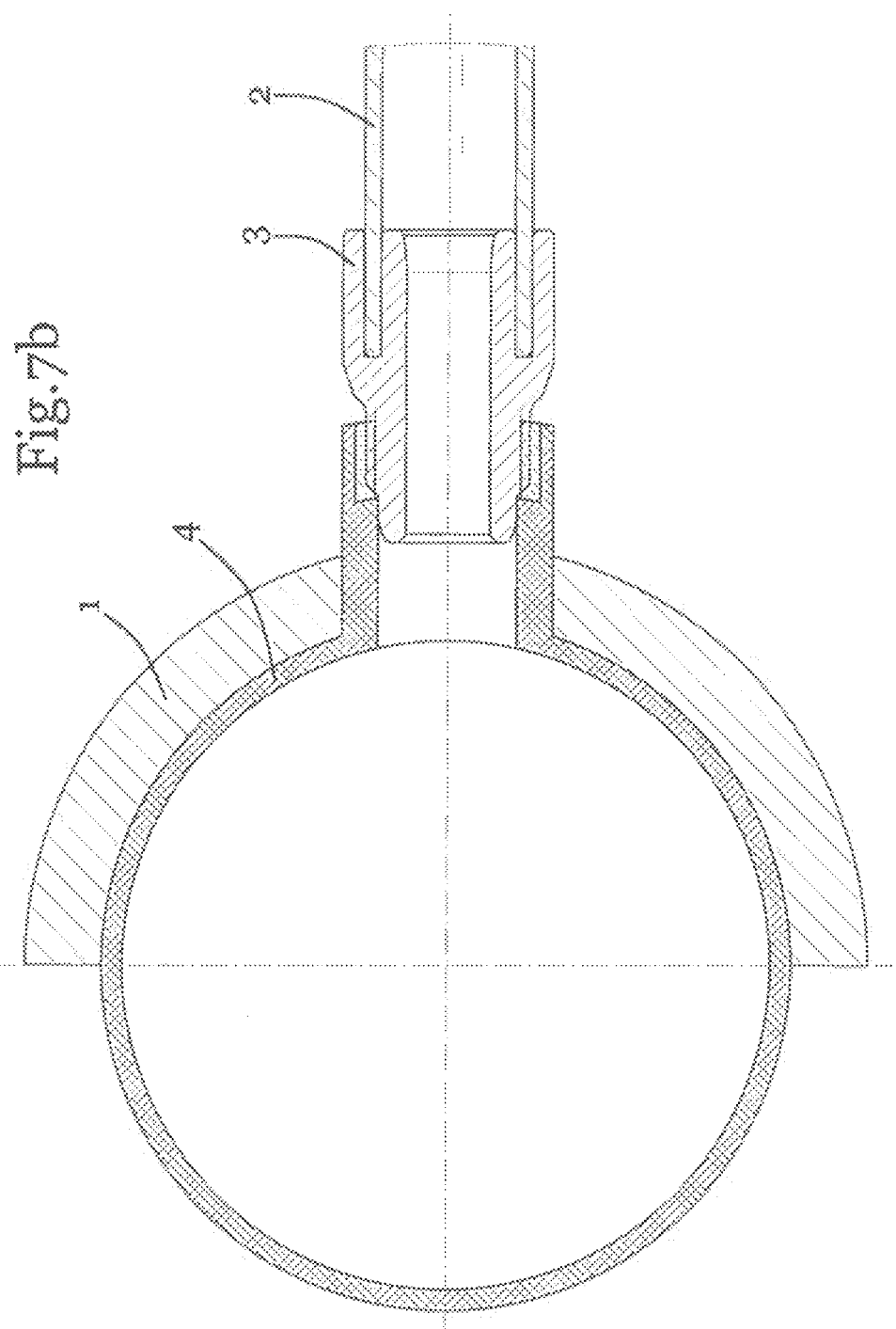

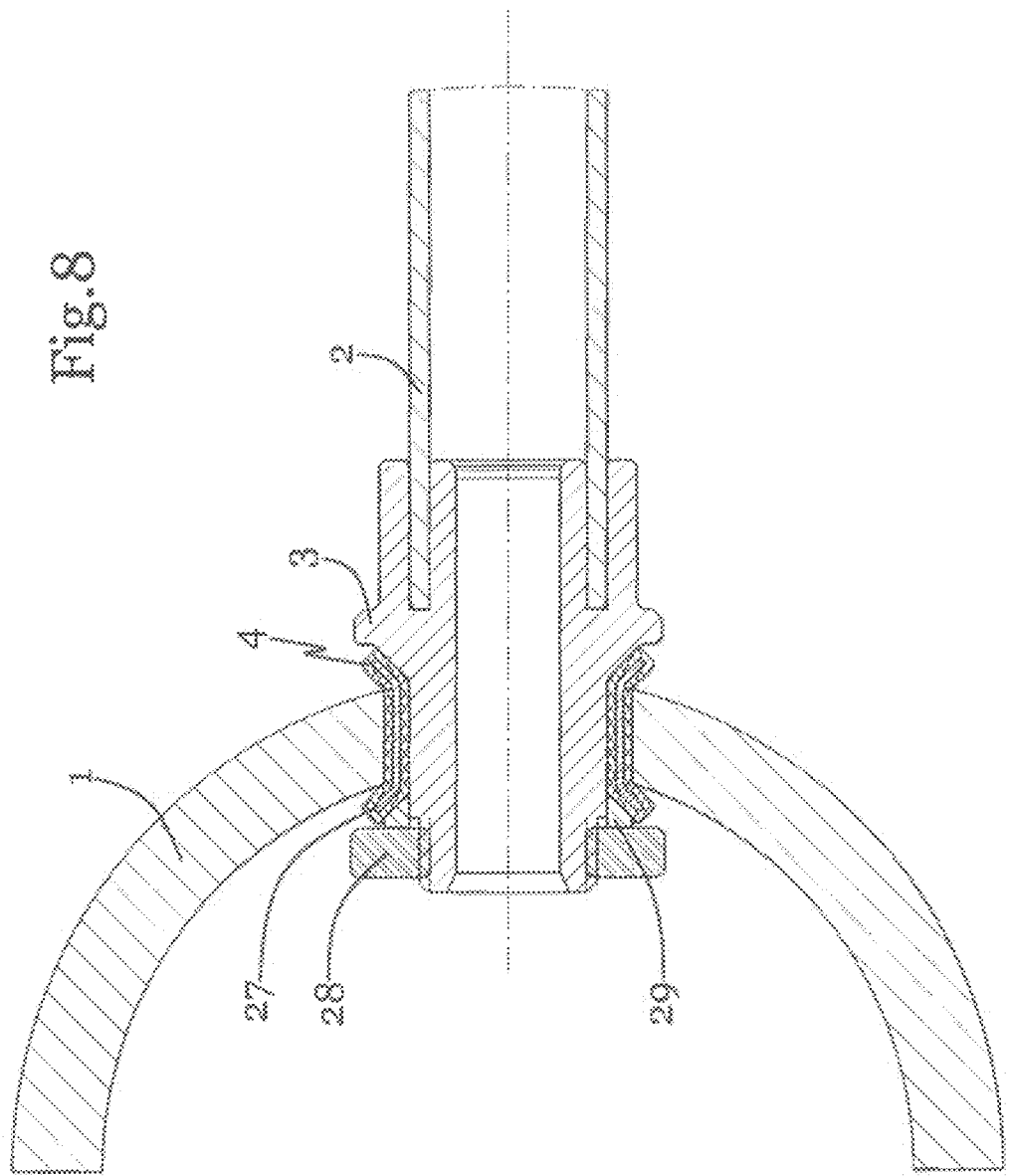

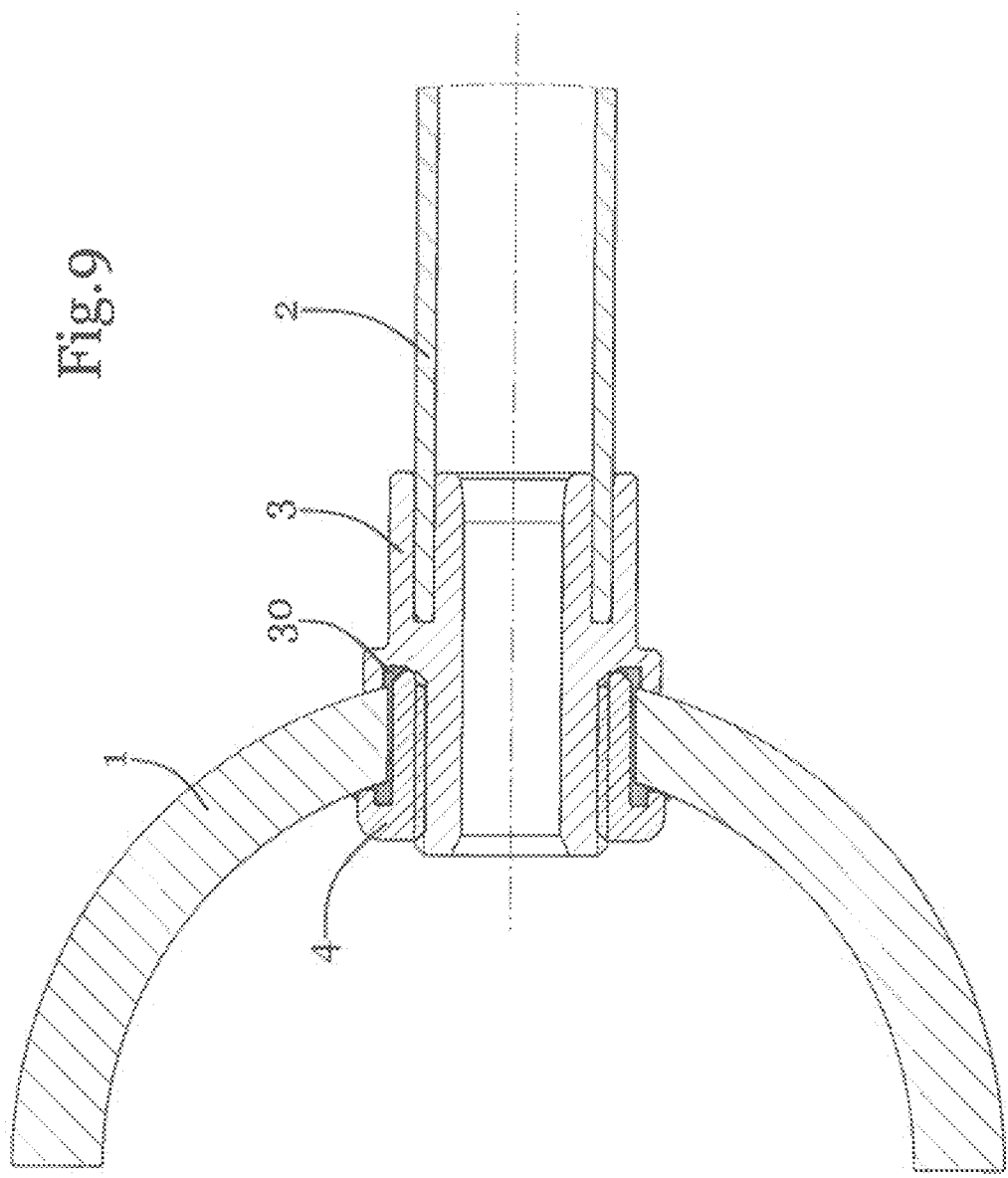

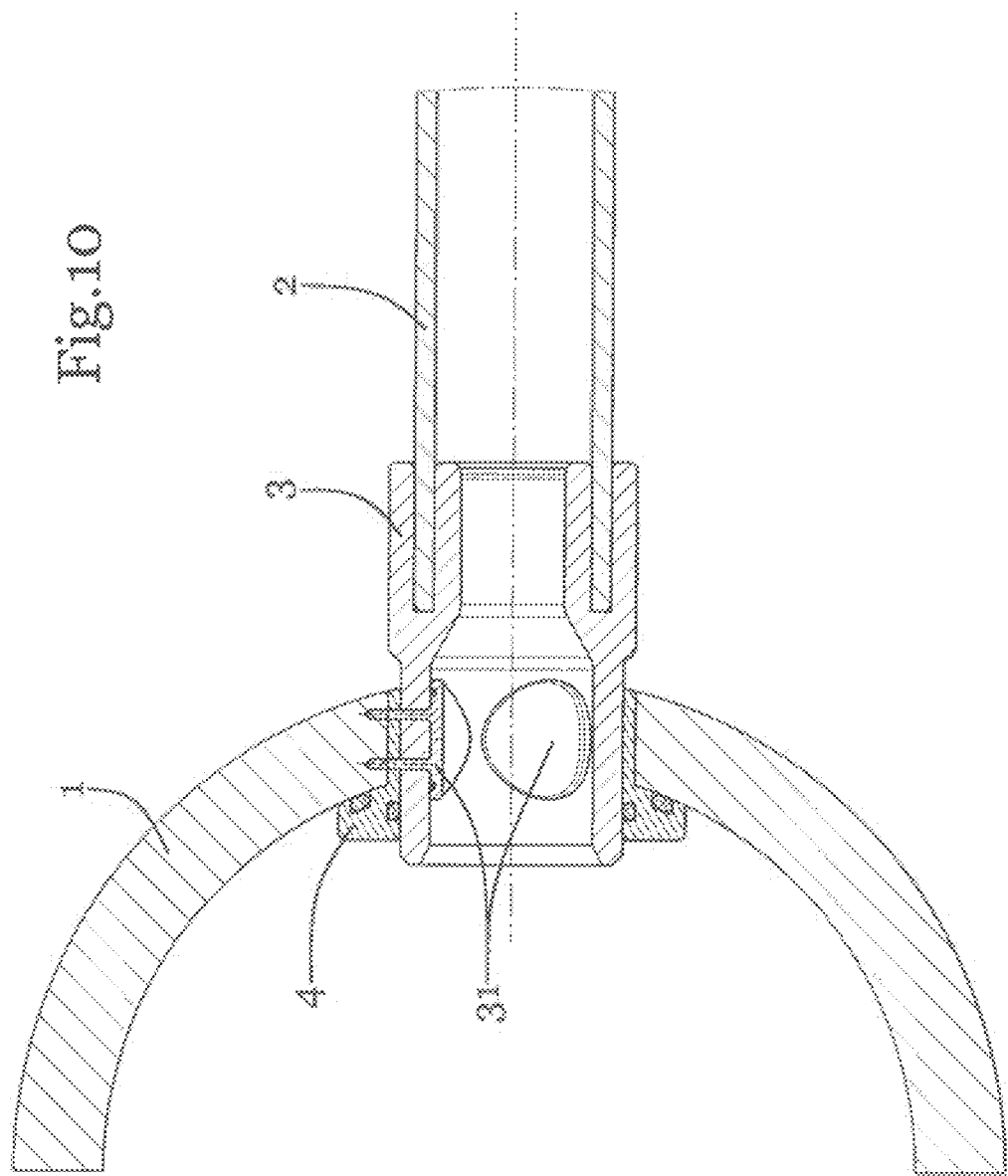

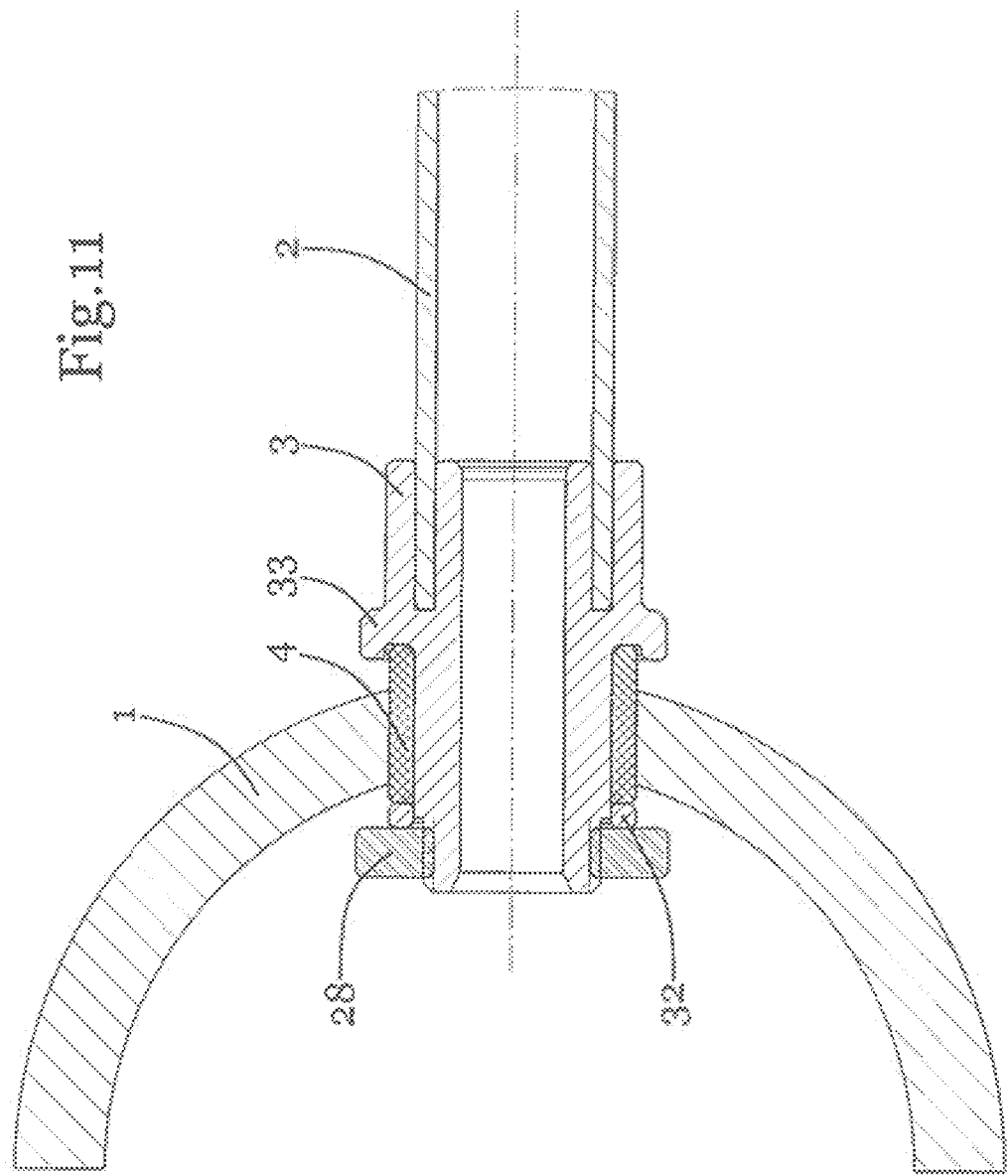

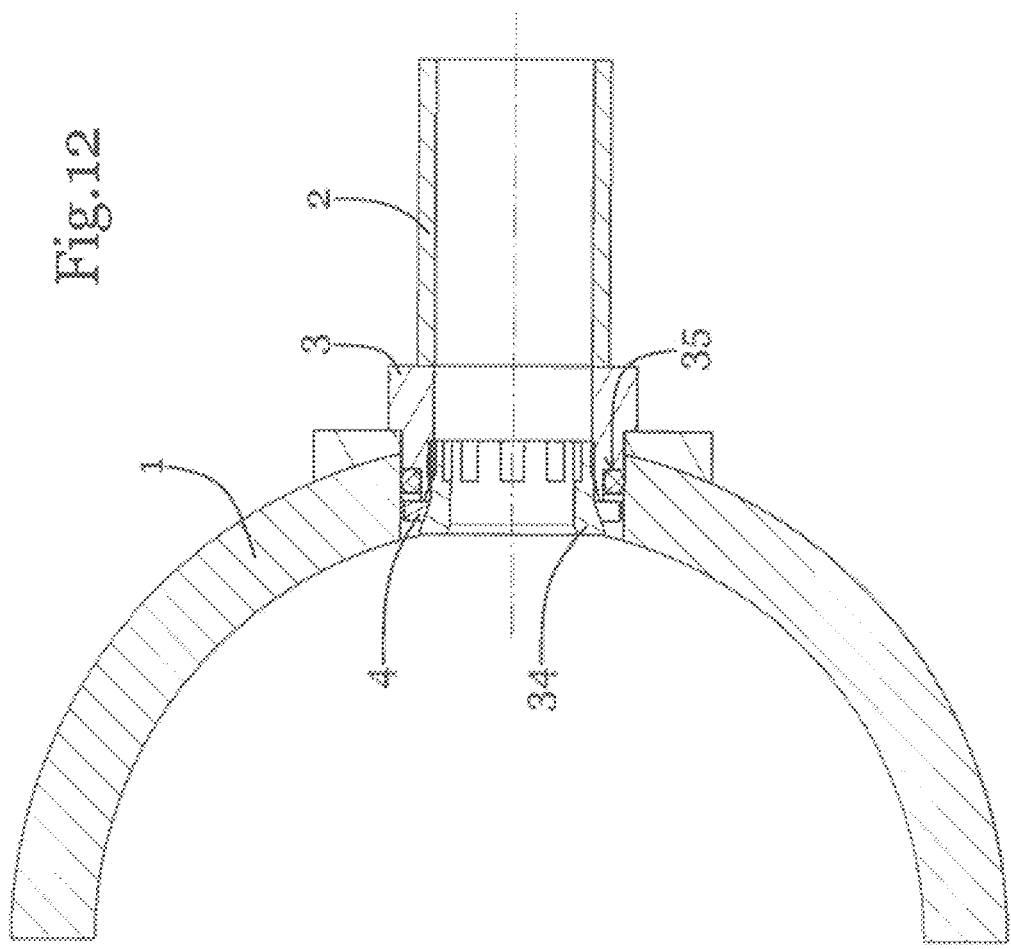

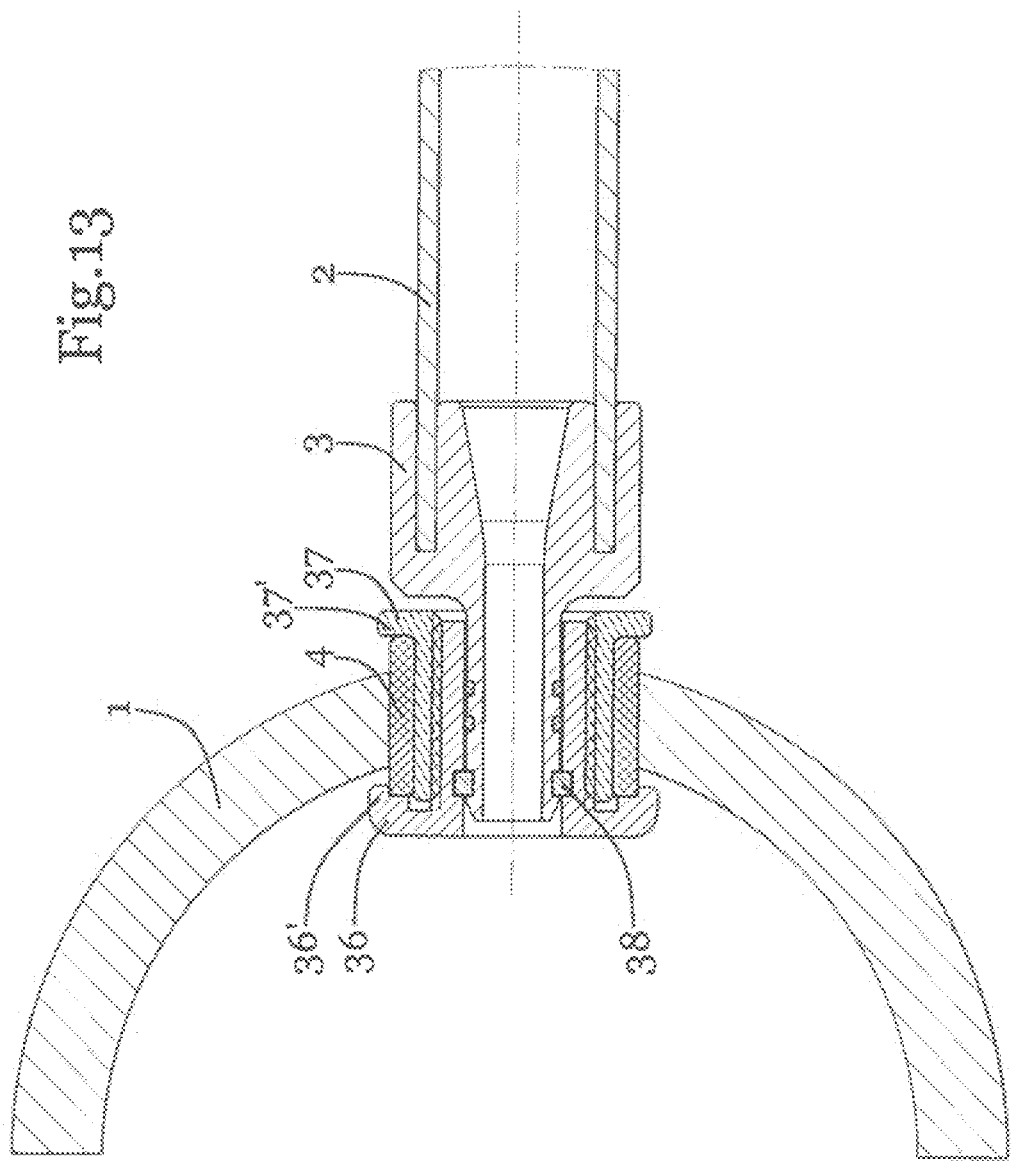

CONNECTION DEVICE

RELATED APPLICATIONS

This application is a National Phase of PCT Patent Application No. PCT/EP2016/079369 having International filing date of Dec. 1, 2016, which claims the benefit of priority of Austrian Patent Application No. A51104/2015 filed on Dec. 28, 2015. The contents of the above applications are all incorporated by reference as if fully set forth herein in their entirety.

FIELD AND BACKGROUND OF THE INVENTION

The invention relates to a connection device for connecting a main pipe to a secondary pipe.

Various connection devices are known from the prior art, in order to connect a secondary pipe to a wall opening, generally a bore, of an existing main pipe, wherein this is generally realized by direct welding of the secondary pipe to the main pipe or by integrating, in particular screwing in, of a cylindrical connection piece, provided with an external thread, into the wall opening. In particular applications, however, it is necessary to mount the secondary pipe without making the main pipe accessible from the exterior. In these applications, the mounting of the connection device must take place in the interior of the main pipe, which causes considerable difficulties in mounting.

For this purpose, for example, the solution shown in FIG. 1 is known, wherein the secondary pipe is firstly inserted through the wall opening of the main pipe and thereafter a sleeve is introduced through the interior of the secondary pipe and is rolled on flat. Thereby, however, only an insufficient sealing of the secondary pipe to the main pipe is achieved.

SUMMARY OF THE INVENTION

An object of the invention therefore consists in providing a generic connection device which enables a simple mounting of the main pipe, wherein, nevertheless, a sufficiently good sealing of the connection site is to be enabled.

This and other problems are solved according to the invention in that for sealing the connection piece, a preferably ring-shaped sealing element, lying against the main pipe, is provided, which is connected directly or via mechanical connection elements, to an outer circumference of the connection piece. On mounting, the sealing element is pressed by the connection piece against the main pipe and seals the wall opening with respect to the through-flowing medium.

The sealing element can comprise metal or plastic.

According to the invention, provision can be made that the sealing element lies against the inner wall of the main pipe in the region of the wall opening. For this, the sealing element can have on one side a surface contour which is adapted to the diameter of the main pipe, in order to enable a good butting against the inner wall. According to the invention, the sealing element can also lie against the face surface of the wall opening of the main pipe, wherein the sealing element is adapted substantially in a ring-shaped manner to the diameter of the wall opening. Combinations are also provided according to the invention, wherein the sealing element lies both against the inner wall of the main pipe and also against the face surface of the wall opening.

According to the invention, provision can be made furthermore that the sealing element is embodied so as to be ring-shaped, and the outer diameter of the sealing element is greater than the diameter of the wall opening of the main pipe. Thereby, the sealing element surrounds the wall opening and is pressed, by further structural provisions as described below, against the inner wall or the wall opening.

The sealing element can have a first sealing surface, preferably formed onto the inner surface of the main pipe, and a second, preferably ring-shaped sealing surface, wherein in the mounted state the first sealing surface lies against the inner wall of the main pipe and the second sealing surface lies against an outer circumference of the connection piece.

Thereby, the effect according to the invention is produced that the connection piece presses the sealing element against the main pipe, so that on mounting of the connection piece the desired sealing effect is achieved. The first sealing surface and the second sealing surface can preferably be arranged angled to one another, for example in an angle of 60° to 90°, depending on the diameter of the main pipe and the dimension of the wall opening. A first sealing ring can be arranged in a groove of the first sealing surface, and a second sealing ring can be arranged in a groove of the second sealing surface, which is advantageous in particular when the sealing ring is made from a metal or the sealing surfaces comprise metal.

According to the invention, the sealing element can comprise on its inner circumference a projection which cooperates in a form-fitting manner with a shoulder on an outer circumference of the connection piece, so that the sealing element on inserting or screwing of the connection piece into the wall opening of the main pipe is pressed against the inner wall of the main pipe. On mounting, the connection piece with mounted sealing element is screwed into the threaded wall opening and the adjustment and the desired sealing is provided automatically upon fastening of the connection piece.

According to the invention, the substantially cylindrical connection piece according to the invention can be embodied in particular such that in lateral direction it has a first region with a radially projecting shoulder for form-fitting connection to the sealing element, a second region with an external thread for screwing into the wall opening of the main pipe, and a third region for connection to a secondary pipe.

For connecting the connection piece according to the invention to a secondary pipe, a substantially cylindrical fitting housing can be provided, which is also claimed as part of the connection device according to the invention.

According to the invention, this fitting housing can have a first opening to receive the connection piece with at least one plug-in connection means, for example a snap ring arranged in a groove of the connection piece, and at least one sealing means, for example a sealing ring. On mounting, the fitting housing can be placed in a simple manner onto the connection piece and engaged.

The fitting housing can have, furthermore, a second opening for receiving a secondary pipe, wherein in the region of the second opening a circumferential expanded sealing chamber is provided, which has a security against extraction in the form of a laterally displaceable clamp, with a tapered outer surface and at least one sealing ring, cooperating with a tapered inner surface of the sealing chamber. Thereby, a particularly simple mounting of the secondary pipe is enabled, which is inserted simply into the second opening of the fitting housing and is fixed there by pulling movement.

According to the invention, provision can be made that on the inner circumference of the fitting housing a first shoulder is provided as a stop for the introduction of the connection piece, and a second shoulder as a stop for the introduction of the secondary pipe. It is thereby achieved that on introducing the connection piece and the secondary pipe a defined end point is able to be detected. In the region of the first shoulder and/or of the second shoulder, furthermore, a mounting display can be provided, in so far as a visual monitoring is possible on mounting.

According to the invention, a multitude of embodiments of the connection device are provided. Thus, provision can be made that the sealing element is embodied as a ring-shaped barrel-type bearing seal with a convex outer circumferential surface, which on its outer circumference lies against the face surface of the wall opening of the main pipe and on its inner circumference is connected via a connecting ring to the outer circumference of the connection piece. The use of a barrel-type bearing seal offers the advantage according to the invention, through the curved geometry, that the connection device is pivotable in a certain range.

According to the invention, provision can also be made that the sealing element is arranged on the outer surface of the main pipe and is screwed with the connection piece and is fixed by a plug-in hook introduced into the wall opening of the main pipe.

In a further embodiment of the invention, the sealing element is embodied as a ring-shaped weld element, which is welded to the connection piece from the inside.

In this case, the connection piece can be embodied as a ring-shaped weld fitting with a circumferential annular shoulder which presses against the likewise ring-shaped weld element and therefore seals the wall opening. The weld element, weld fitting and main pipe are welded to one another on mounting. To increase the stability of the secondary pipe, a support bush can be provided in the interior of the weld fitting.

In a further embodiment of the invention, the sealing element is able to be compressed by a screw clamp out from the interior of the main pipe. The screw clamp is able to be screwed onto a stop inserted into the wall opening and is connected to the connection piece via a connecting ring. The sealing element is pressed in by a shoulder of the screw clamp between the inner wall of the main pipe and the stop.

In a further embodiment of the invention, the sealing element is embodied as a sealing jacket at least partially covering the inner circumference of the pipe. In this embodiment, the sealing jacket extends in a certain longitudinal portion over the entire inner circumference of the main pipe and is only interrupted by the introduced connection piece. The connection to the pipe transition takes place in this case via an insert piece which is inserted between the sealing element and the connection piece.

In a further embodiment of the invention, the sealing element is arranged on the face side of the wall opening, projects in an angled manner into the interior of the main pipe and comprises a thrust protection, preferably in the form of an inserted sheet metal part. In this embodiment, the connection piece carries a screwed-on clamping nut and a wedge clamping disc which is in contact with the angled sealing element projecting into the interior of the main pipe. On actuating of the clamping nut, the wedge clamping disc is pushed against the sealing element and presses the latter against the inner circumference of the main pipe, so that the desired sealing effect is achieved.

According to the invention, the sealing element can also be fixed by sealing foam in the wall opening of the main pipe. The sealing foam is preferably introduced after mounting into the remaining intermediate space between the face side of the wall opening and the sealing element or the connection piece.

According to the invention, at least one connecting pin can be provided on the inner circumference of the connection piece, which connecting pin connects the connection piece to the sealing element and to the main pipe and therefore fixes the sealing element in its position.

In a further embodiment of the invention, the connection piece comprises a screwed-on clamping nut and a clamping disc which is in contact with the sealing element projecting into the interior of the main pipe, so that on actuating of the clamping nut the clamping disc presses the sealing element against a stop of the connection piece. The sealing element is chambered by the clamping disc on the one side and by the stop on the other side, and is pressed by actuation of the clamping nut against the face surface of the wall opening of the main pipe.

In a further embodiment of the invention, a tapered clamp is provided, which is displaceable through a tapered ring able to be screwed onto the connection piece and presses the sealing element, arranged on the face surface of the wall opening, on its tapered outer surface against a stop, provided on the connection piece, and against the face surface of the wall opening. In this embodiment, the secondary pipe can also be mounted entirely from the exterior.

In a further embodiment of the invention, an inner sealing clamp with an inner stop, and an outer sealing clamp with an outer stop are provided in the wall opening, wherein the sealing element arranged on the face side of the wall opening is chambered between the stops, and wherein the connection piece is connected with the inner sealing clamp via a connecting ring. On pushing one of the two sealing clamps into the wall opening or respectively onto the connection piece, the sealing element, chambered therebetween, is pressed together and against the face side of the wall opening, so that the desired sealing is achieved.

Further features in accordance with the invention will emerge from the claims, the figure description and the drawings.

BRIEF DESCRIPTION OF SEVERAL VIEWS OF THE INVENTION

FIG. 3 shows a cross-sectional view of a further embodiment of a connection device according to the invention;

FIG. 4 shows a cross-sectional view of a further embodiment of a connection device according to the invention;

FIG. 5 shows a cross-sectional view of a further embodiment of a connection device according to the invention;

FIG. 6 shows a cross-sectional view of a further embodiment of a connection device according to the invention;

FIGS. 7a and 7b show cross-sectional views of a further embodiment of a connection device according to the invention;

FIG. 8 shows a cross-sectional view of a further embodiment of a connection device according to the invention;

FIG. 9 shows a cross-sectional view of a further embodiment of a connection device according to the invention;

FIG. 10 shows a cross-sectional view of a further embodiment of a connection device according to the invention;

FIG. 11 shows a cross-sectional view of a further embodiment of a connection device according to the invention;

FIG. 12 shows a cross-sectional view of a further embodiment of a connection device according to the invention;

FIG. 13 shows a cross-sectional view of a further embodiment of a connection device according to the invention.

DESCRIPTION OF SPECIFIC EMBODIMENTS OF THE INVENTION

The invention is explained in further detail below with the aid of non-exclusive example embodiments. All the figures show a cross-section through a main pipe 1, to which a secondary pipe 2 is connected by one of the embodiments according to the invention, wherein the cross-section is made along the symmetry axis of the secondary pipe.

Figure 1:
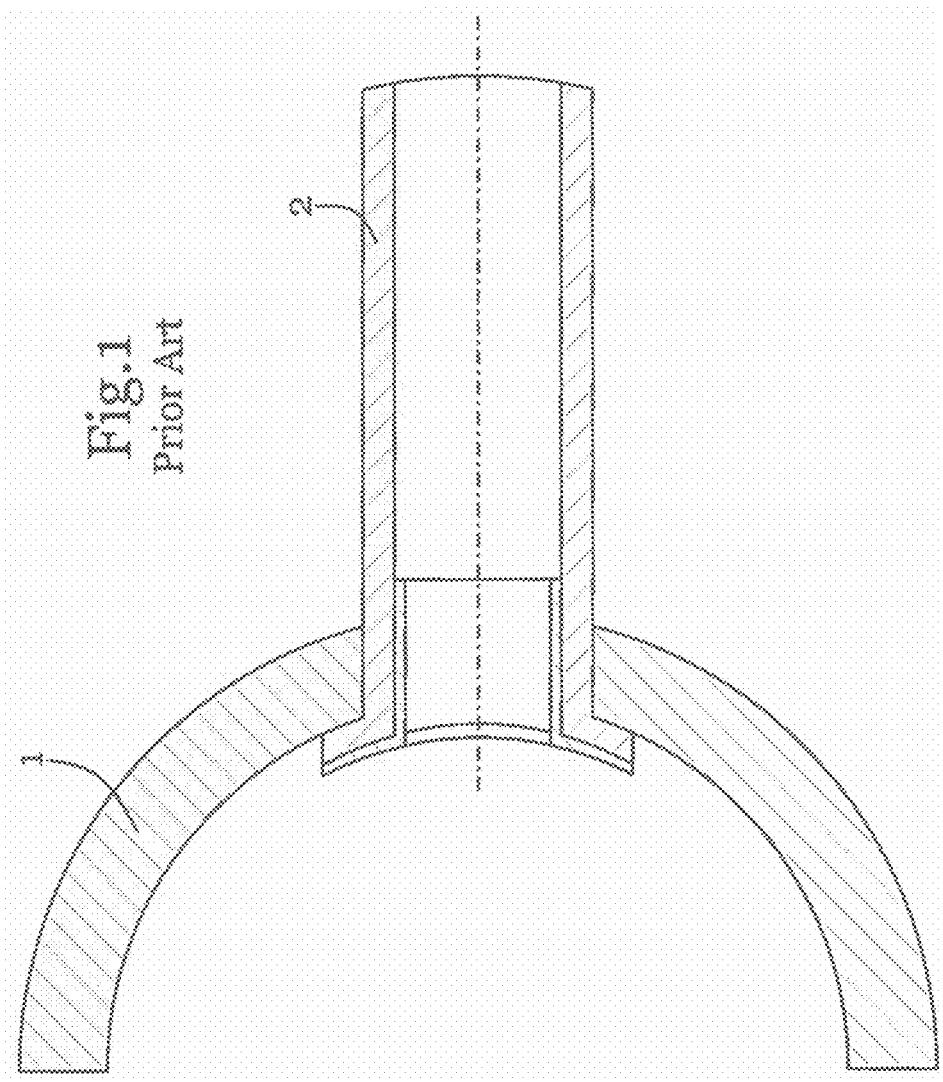
FIG. 1 shows a cross-sectional view of a connection device known from the prior art.

FIG. 1 shows a connection device, known from the prior art, for mounting a secondary pipe 2 onto a main pipe 1, wherein the secondary pipe 2 is sealed in the interior of the main pipe by rolling-on of a sleeve.

Figure 2:
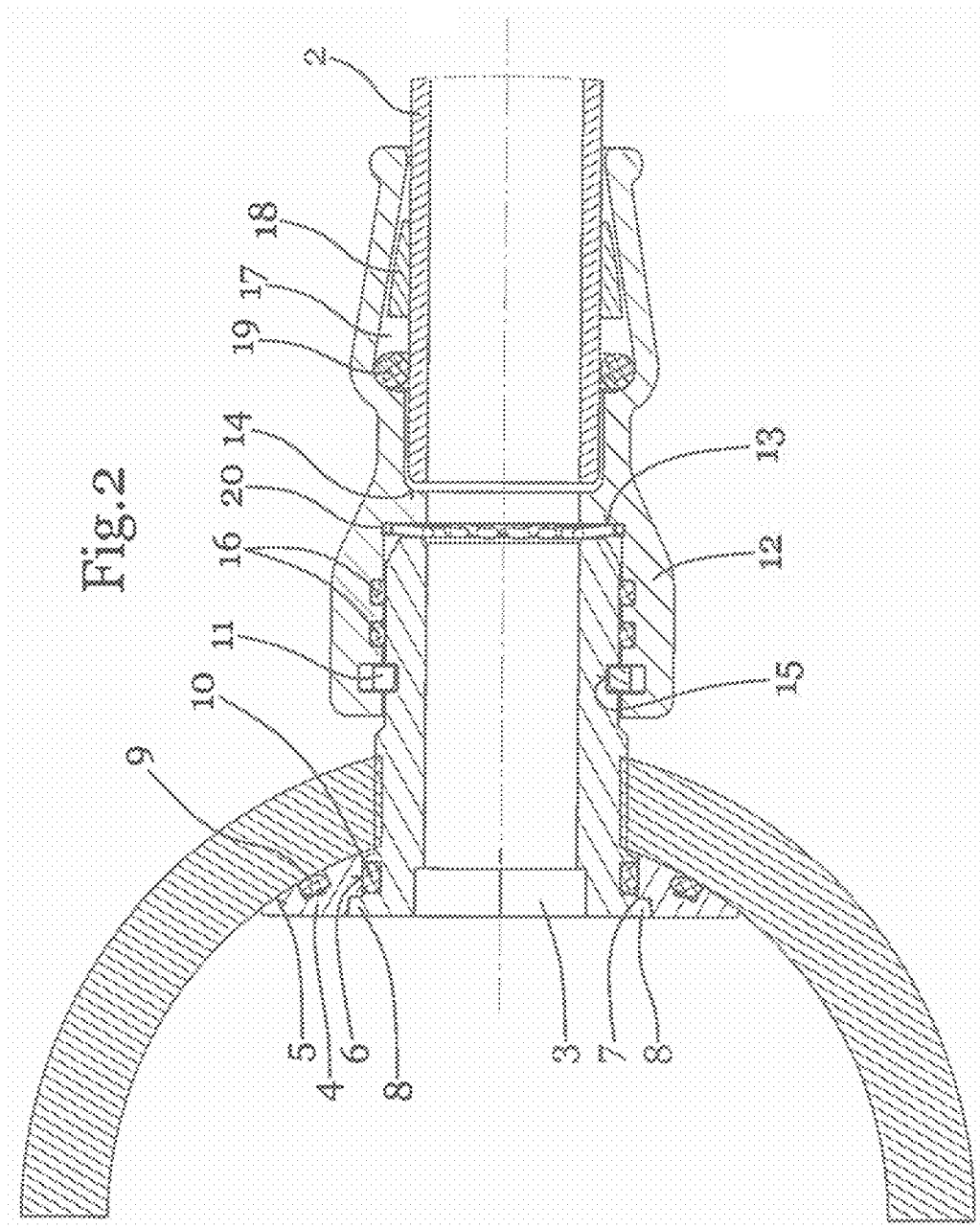
FIG. 2 shows a cross-sectional view of an embodiment of a connection device according to the invention.

FIG. 2 shows an embodiment of a connection device according to the invention. The connection device comprises a cylindrical connection piece 3 which is screwed into a wall opening of a main pipe 1 via a diagrammatically illustrated threaded connection. In an alternative embodiment, which is not illustrated, to reduce the stress of the pipe, no thread is provided in the main pipe 1, but rather the connection piece 3 is fixed on the outer side via a counter-nut. For sealing the connection piece 3, a ring-shaped sealing element 4 is provided, lying against the main pipe 1, the outer diameter of which sealing element is greater than the diameter of the wall opening. The sealing element 4 has a first sealing surface 5, which is adapted to the shape of the inner wall of the main pipe 1. In this first sealing surface 5, a first sealing ring 9 is arranged in a groove. Furthermore, the sealing element 4 has a second ring-shaped sealing surface 6, which is in contact with an outer circumference of the connection piece 3. In the second sealing surface 6, a second sealing ring 10 is likewise arranged in a groove. The first sealing surface 5 and the second sealing surface 6 are arranged in accordance with the pipe circumference conditions, illustrated by way of example, at an angle of approximately 80° to one another.

The sealing element 4 comprises on its inner circumference a ring-shaped projection 7, which cooperates in a form-fitting manner with a likewise ring-shaped shoulder 8 on the outer circumference of the connection piece 3.

It is thereby achieved that on screwing-in of the connection piece 3 into the wall opening of the main pipe 1, the sealing element 4 is pressed via the shoulder 8 and the projection 7 against the inner wall of the main pipe 1, so that the desired pressing of the sealing element 4 or respectively of the two sealing rings 9, 10 is achieved.

The connection piece 3 is divided substantially into three regions, namely initially a first region, which in the mounted state lies in the interior of the main pipe 1 and has the radially projecting, circumferential shoulder 8 for form-fitting connection with the sealing element 4. Adjoining thereto, a second region is provided, which carries an external thread for screwing the connection piece 3 into the wall opening of the main pipe 1. Finally, at the other end of the connection piece 3, a third region is provided, which serves for connection of the secondary pipe 2. For this purpose, the connection device has a substantially cylindrical fitting housing 12, which can be placed onto the third region of the connection piece 3.

The fitting housing 12 has a first opening for receiving the connection piece 3, wherein plug-in connecting means are provided, in order to enable a simple plug-in connection. The plug-in connecting means are embodied in the present example embodiment as snap ring 11, which is arranged in a circumferential groove 15 on the outer circumference of the connection piece 3, and is embodied for engagement into a circumferential groove on the inner circumference of the fitting housing 12. In addition, two sealing rings 16 are arranged between the inner circumference of the fitting housing 12 and the outer circumference of the connection piece 3.

The fitting housing 12 has a second opening for receiving the secondary pipe 2. In the region of the second opening, a circumferential sealing chamber 17 is provided, which comprises a security against extraction for the secondary pipe 2. In the present example embodiment, the security against extraction is embodied in the form of a laterally displaceable clamp 18 with a tapered outer surface.

The clamp cooperates on its outer surface with a correspondingly conically shaped inner surface of the sealing chamber 17, so that on drawing back of the secondary pipe the security against traction is activated and counteracts a further pulling movement of the secondary pipe by clamping of the clamp 18. Furthermore, a sealing ring 19 is provided in the interior of the sealing chamber 17.

On the inner circumference of the fitting housing 12, a first circumferential shoulder 13 and a second circumferential shoulder 14 are provided, which serve as a stop for the introduction of the connection piece and of the secondary pipe 2.

Thereby, it is ensured that these elements are not introduced too deeply into the fitting housing. Furthermore, a mounting display 20 is provided in the interior of the fitting housing 12, which visually displays the introducing of the connection piece 3.

FIG. 3 shows a further embodiment of a connection device according to the invention. In this embodiment, the sealing element 4 is embodied as a barrel-type bearing seal, which lies on its outer, curved circumference against the face surface 21 of the wall opening of the main pipe 1. On its inner circumference, the sealing element 4 is in engagement in a form-fitting manner via a connecting ring 22 with the connection piece 3. The secondary pipe 2 is inserted into a face-side annular groove of the connection piece 3.

FIG. 4 shows a further embodiment of a connection device according to the invention. In this embodiment, the sealing takes place by a sealing element 4 which is arranged on the outer side of the main pipe 1. The sealing element 4 is screwed with the connection piece 3. In order to fix the connection piece 3 in the wall opening, a ring-shaped plug-in hook 23 is provided, which fixes the arrangement and assists the pressing of the sealing element. The secondary pipe 2 is inserted into the connection piece.

FIG. 5 shows a further embodiment of a connection device according to the invention. In this embodiment, the sealing takes place by the sealing element 4 being embodied as a ring-shaped weld element. The ring-shaped weld element has a shoulder and is inserted into the connection piece, which is embodied as a weld fitting.

On mounting, the elements are welded into one another, wherein a separate support bush 23 is provided for stabilizing the secondary pipe 2 in the connection piece 3.

FIG. 6 shows a further embodiment of a connection device according to the invention. In this embodiment, the sealing takes place via an internal, ring-shaped sealing element 4, which by tightening of a screw clamp 24, screwed onto an inserted stop 25, is pressed together and against the inner surface of the main pipe 1. The ring-shaped stop 25, which is partially provided with a thread, gives the sealing element 4 a stable hold and permits the centred introduction of the connection piece 3.

The screw clamp 24 is in form-fitting connection with the connection piece 3 via a connecting ring 26. The stop 25 must be inserted from the exterior into the wall opening.

FIG. 7a shows a further embodiment of a connection device according to the invention. In this embodiment, the sealing element 4 is embodied as a sealing jacket covering the inner circumference of the pipe in a partial portion. The connecting of the sealing jacket to the connection piece 3 takes place via an insert piece. FIG. 7b shows a further variant of this embodiment, in which the sealing element 4 extends through the opening of the main pipe 1 in a radial direction outwards and is only connected there to the connection piece 3.

FIG. 8 shows a further embodiment of a connection device according to the invention. In this embodiment, the sealing element 4 comprises an inserted thrust protection in the form of a sheet metal part 27. The latter counteracts a buckling of the sealing element 4, so that the sealing element 4 is not reduced in its longitudinal extent. The connection piece 3 comprises a screwed-on clamping nut 28 and a wedge-shaped clamping disc 29. The sealing element 4 is arranged in the region of the face surface of the wall opening and projects into the interior of the main pipe. The clamping disc 29 is in angled contact with the sealing element 4, so that on actuating of the clamping nut 28 the clamping disc 29 presses the sealing element 4 outwards.

Owing to the inserted thrust protection 27, the sealing element 4 cannot be shortened, but rather bends upwards, so that the desired sealing effect is achieved. On the other side of the wall opening, a stop is provided on the connection piece 3, which stop counteracts a shifting aside of the sealing element 4.

FIG. 9 shows a further embodiment of a connection device according to the invention. In this embodiment, the sealing element 4 is embodied as a sealing clamp which is fixed by sealing foam 30 in its position in the wall opening of the main pipe 1.

FIG. 10 shows a further embodiment of a connection device according to the invention. In this embodiment, the sealing element 4 lies both against the inner surface of the main pipe 1 and also against the face surface of the wall opening.

In order to connect the sealing element 4 to the connection piece 3 and to the main pipe 1, connecting pins 31 are provided, which are driven out from the interior of the connection piece 3 into the main pipe 1.

FIG. 11 shows a further embodiment of a connection device according to the invention. In this embodiment, the sealing to the main pipe 1 takes place by a tubular sealing element 4, which is chambered by a clamping disc 32 and a stop 33 of the connection piece 3. A clamping nut is 28 is arranged on the connection piece 3, so that on tightening of the clamping nut 28 the sealing element 4 is clamped and pressed against the main pipe 1, so that the desired sealing effect occurs.

FIG. 12 shows a further embodiment of a connection device according to the invention. In this embodiment, the sealing takes place on the face side of the wall opening by means of a seal and a sealing element 4 embodied as a conical clamp. The system is fixed onto the connection piece 3 by means of the conical clamp by screwing of a tapered ring 34. Here, the seal is pressed against a stop 35 of the connection piece 3, so that the desired sealing effect occurs. Particularly advantageously, this embodiment can also be mounted exclusively from the exterior.

FIG. 13 shows a further embodiment of a connection device according to the invention. In this embodiment, the sealing to the main pipe 1 takes place via a sealing element 4, which is chambered by an inner sealing clamp 36 with an inner stop 36' and by an outer sealing clamp 37 with an outer stop 37', and is pressed against the face side of the wall opening of the main pipe 1. The connection piece 3 is connected with the inner sealing clamp 36 via a connecting ring 38 arranged in two opposite grooves.

LIST OF REFERENCE NUMBERS 1 main pipe
2 secondary pipe
3 connection piece
4 sealing element
5 first sealing surface
6 second sealing surface
7 projection
8 shoulder
9 first sealing ring
10 second sealing ring
11 snap ring
12 fitting housing
13 first shoulder
14 second shoulder
15 groove
16 sealing ring
17 sealing chamber
18 clamp
19 sealing ring
20 mounting display
21 face surface of the wall opening
22 connecting ring
23 plug-in hook
24 screw clamp
25 stop
26 connecting ring
27 sheet metal part
28 clamping nut
29 wedge clamping disc
30 sealing foam
31 connecting pin
32 clamping disc
33 stop
34 tapered clamp
35 stop
36 sealing clamp
36' inner stop
37 outer sealing clamp
37' outer stop
38 connecting ring

What is claimed is:

1. A connection device for connecting a main pipe (1) to a secondary pipe (2), comprising a substantially cylindrical connection piece (3) shaped to be inserted and screwed into a wall opening of the main pipe (1), for connection of the secondary pipe (2), wherein for sealing the connection piece (3) a ring-shaped sealing element (4) is provided, lying against the main pipe (1), which sealing element is connected directly or via mechanical connecting elements to an outer circumference of the connection piece (3), wherein the sealing element (4) comprises, on an inner circumference, a projection (7) abutted to a shoulder (8) on the outer circumference of the connection piece (3), so that the sealing element (4) on inserting and screwing of the connection piece (3) into the wall opening of the main pipe (1) is pressed against an inner wall of the main pipe (1);

wherein the sealing element (4) has a first sealing surface (5), formed onto an inner surface of the main pipe, and a second, ring-shaped sealing surface (6), wherein in a mounted state, the first sealing surface (5) lies against the inner wall of the main pipe (1) and the second sealing surface (6) lies against the outer circumference of the connection piece (3); and wherein a first sealing ring (9) is arranged in a groove of the first sealing surface (5), and a second sealing ring (10) is arranged in a groove of the second sealing surface (6).

2. The connection device according to claim 1, wherein the sealing element (4) lies against the inner wall of the main pipe (1) in a region of the wall opening.

3. The connection device according to claim 1, wherein an outer diameter of the sealing element (4) is greater than a diameter of the wall opening of the main pipe (1).

* * * * *